(12) United States Patent
Eberhart et al.

(10) Patent No.: US 8,705,566 B2
(45) Date of Patent: Apr. 22, 2014

(54) METHOD AND APPARATUS IN WHICH CALL SIGNALING MESSAGES BYPASS IN-TRANSPARENT SWITCHING NODES OR NETWORKS

(75) Inventors: Ranier Eberhart, Munich (DE); Dietmar Lehmann, Zorneding (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 13/389,104

(22) PCT Filed: Jan. 26, 2011

(86) PCT No.: PCT/EP2011/000350
§ 371 (c)(1),
(2), (4) Date: Feb. 6, 2012

(87) PCT Pub. No.: WO2011/092007
PCT Pub. Date: Aug. 4, 2011

(65) Prior Publication Data
US 2012/0281691 A1    Nov. 8, 2012

Related U.S. Application Data

(60) Provisional application No. 61/299,049, filed on Jan. 28, 2010.

(51) Int. Cl.
*H04J 3/16* (2006.01)

(52) U.S. Cl.
USPC ........................................... 370/467

(58) Field of Classification Search
USPC ............. 370/252, 259, 328, 351–352, 389, 370/395.2, 395.52; 709/227–228
See application file for complete search history.

(56) References Cited

U.S. PATENT DOCUMENTS

| | | | |
|---|---|---|---|
| 7,372,876 B2 | 5/2008 | Abel et al. | |
| 7,437,465 B2 | 10/2008 | Rousseau | |
| 7,626,979 B1 * | 12/2009 | Bugenhagen et al. | 370/352 |
| 2004/0081160 A1 * | 4/2004 | Rousseau | 370/395.2 |
| 2004/0170180 A1 * | 9/2004 | Abel et al. | 370/395.2 |
| 2006/0171380 A1 * | 8/2006 | Chia | 370/352 |
| 2007/0014277 A1 * | 1/2007 | Ebbesen et al. | 370/351 |
| 2010/0054259 A1 * | 3/2010 | Khan | 370/395.52 |

(Continued)

FOREIGN PATENT DOCUMENTS

WO    2005/099241 A1    10/2005

OTHER PUBLICATIONS

International Search Report for PCT/EP2011/000350 dated May 31, 2011 (Form PCT/ISA/210).

(Continued)

*Primary Examiner* — Anh-Vu Ly
*Assistant Examiner* — Gustavo Lopez-Vargas
(74) *Attorney, Agent, or Firm* — Buchanan Ingersoll & Rooney PC

(57) ABSTRACT

A method is disclosed for initiating a call in a communication network between a first signaling entity and a second signaling entity each connected to a respective node and the nodes connected to a network wherein communications between the signaling entities and the nodes are conducted using a first protocol and communications are carried over the network using a second protocol. Call setup information is also exchanged between the first node and the second node over a separate connection.

11 Claims, 3 Drawing Sheets

(56) References Cited

U.S. PATENT DOCUMENTS

| | | | |
|---|---|---|---|
| 2010/0195570 A1* | 8/2010 | Tamura et al. | 370/328 |
| 2010/0202447 A1* | 8/2010 | Long et al. | 370/352 |
| 2011/0149954 A1* | 6/2011 | Poremba et al. | 370/352 |
| 2011/0158129 A1* | 6/2011 | Liu et al. | 370/259 |
| 2011/0158130 A1* | 6/2011 | Liu et al. | 370/259 |
| 2011/0255532 A1* | 10/2011 | Nix et al. | 370/352 |

OTHER PUBLICATIONS

Written Opinion of the International Searching Authority dated May 31, 2011 (Form PCT/ISA/237).

Elwell et al., "Interworking between the Session Initiation Protocol (SIP) and QSIG; rfc4497.txt", IETF Standard, Internet Engineering Task Force, IETF, CH, May 1, 2006, XP015055000, ISSN: 0000-0003.

* cited by examiner

METHOD AND APPARATUS IN WHICH CALL SIGNALING MESSAGES BYPASS IN-TRANSPARENT SWITCHING NODES OR NETWORKS

CROSS-REFERENCE TO RELATED APPLICATIONS

This application is the United States national phase under 35 U.S.C. §371 of PCT International Patent Application No. PCT/EP2011/000350, filed on Jan. 26, 2011, which claims the benefit of U.S. Provisional Application Ser. No. 61/299,049 filed Jan. 28, 2010.

BACKGROUND OF THE INVENTION

1. Field of the Invention

The invention relates to network communication systems in which user devices are connected to a network through gateways or other nodes.

2. Background of the Related Art

In many communication networks there is a requirement to transparently connect two signaling entities via a switching node or network which is however not transparent to this type of signaling messages. Currently this problem is solved in two ways.

In one solution all signaling messages and parameters must be interworked to the protocol that is handled by the switching node/network. This not only includes a simple mapping of messages and parameters but sometimes also requires a logical mapping to a completely different message flow. This is necessary in cases where the different signaling protocols implement the various signaling capabilities in a completely different way. This method has several disadvantages. The interworking of messages, parameters and logical message flows is quite complex and sometimes impossible. At the least, it can lead to high cost efforts to implement this interworking of the signaling protocols. Furthermore, changes in one protocol may cause a different mapping or a completely new message flow.

In a second solution all signaling messages must be tunneled through the in-transparent switching node/network. This process may require an administrative effort to establish the tunnels. Additionally if there are different size limits for the signaling messages, the tunneling introduces fragmentation of the signaling messages. This in turn leads to severe speech clipping situations as result of delayed signaling messages.

We provide a method and apparatus which overcomes these disadvantages and which is illustrated in the attached drawings. Our method and apparatus as shown in the attached drawings and can be implemented through the use of components currently used in the HiPath4000 communications system available from Siemens Enterprise Communications GmbH & Co. KG. Of course, other embodiments of our method and apparatus may use other components or other nodes.

BRIEF SUMMARY OF THE INVENTION

In a method for initiating a call in a communication network between a first signaling entity and a second signaling entity each connected to a respective node and the nodes connected to a network, communications between the signaling entities and the nodes are conducted using a first protocol and communications are carried over the network using a second protocol. A first signaling entity sends a request for call setup using the first protocol to a first node. That node converts the request from the first protocol to a second protocol and sends the request over the network to a second node connected to a second signaling entity. The second node receives and converts the call setup request from the second protocol to the first protocol in the second node and establishes a separate connection between the first node and the second node over which communications can be sent using the first protocol. The second node forwards information concerning the separate connection from the second node to the first node over the network using the second protocol. Call setup information is exchanged between the first node and the second node over the separate connection. Messages can then be sent between the first node and the second node over the separate connection using the first protocol and other messages can be sent between the first node and the second node over the network using the second protocol.

We also provide a communications system containing a communication network, a first signaling entity connected to the network through a first node and a second signaling entity connected to the network through a second node. Communications between the nodes and the signaling entities are conducted using a first protocol and communications are carried over the network using a second protocol that is different from the first protocol. The nodes have the capability of translating messages received from the signaling entities in a format according to the first protocol to a format according to the second protocol for transmission over the network using a second protocol.

HG3500 refers to the peripheral board used in a HiPath4000 system, which can also be used as an SIP gateway.

HG3575 refers to the peripheral board used in a HiPath4000 system which can be used to connect IP based shelves to a HiPath4000 communications system.

HHS refers to a HiPath Host system.

MP is a message proxy connection.

Prot is protocol.

SIP is Session Initiation Protocol (certain standards for SIP protocol are generally outlined in RFC 3261, SIP: Session Initiation Protocol (June 2002, Rosenberg, et. al), the entirety of which is incorporated by reference herein by reference.

SoftGate is a software only solution for a peripheral HiPath4000 shelf.

DETAILED DESCRIPTION OF THE INVENTION

Figure 1:
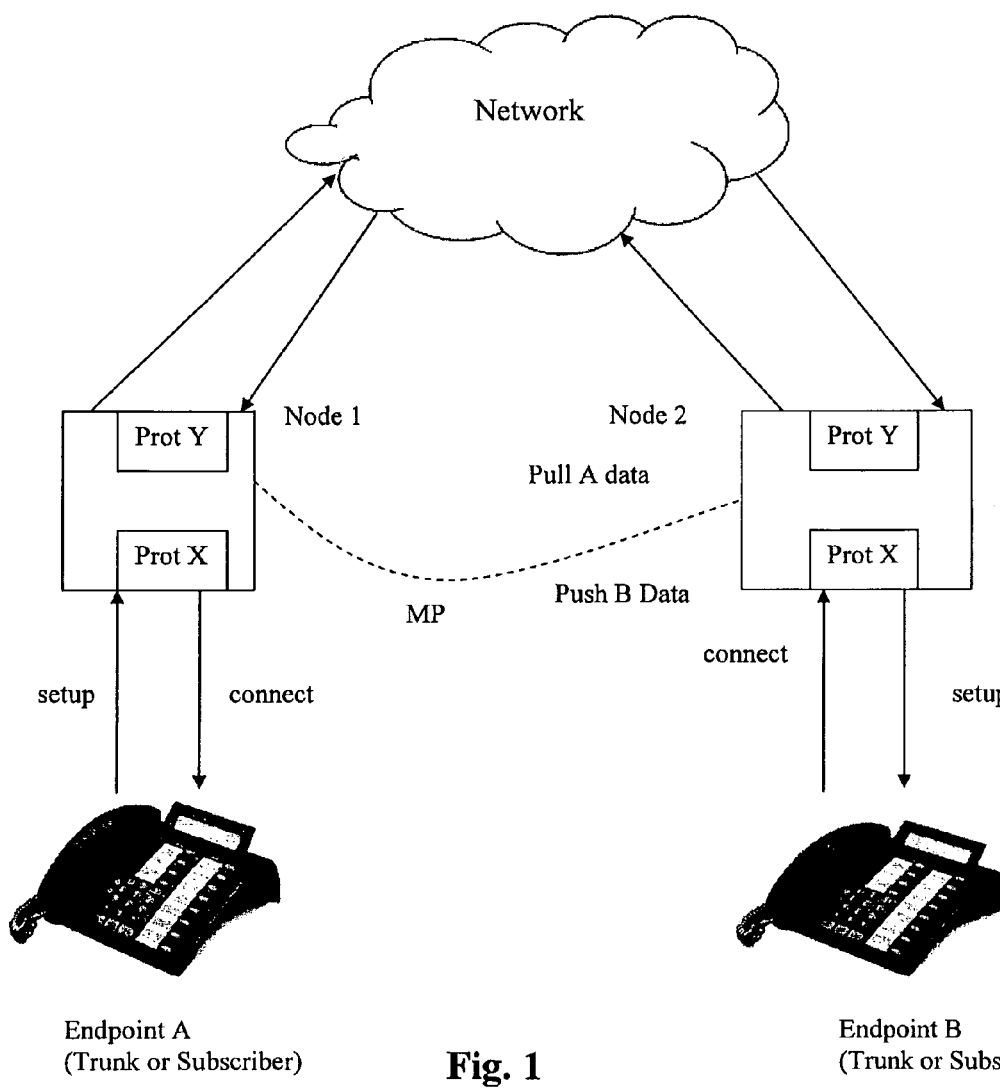
FIG. 1 is a diagram showing a generic implementation of an embodiment of a communication system.

FIG. 1 illustrates the present method and apparatus generically without reference to a particular protocol or equipment. There are two signaling entities as endpoints A, B wherein each signaling entity is e.g. signaling device of a trunk or a user device of a subscriber. The endpoints are illustrated as telephones, such as analog telephones, digital telephones or IP telephones, that enable a user to communicate over a network. The user devices are not limited to telephones and could be computer terminals, computer devices, laptops, cell phones, personal digital assistants (PDAs), pagers, mobile terminal devices or other terminal devices such as a router or a switch. Each user device is connected to the network through a gateway or other node. In the example of FIG. 1, telephone or endpoint A accesses the network through Node 1 and telephone or endpoint B accesses the network through Node 2.

It should be appreciated that the endpoints A and B discussed below may be referred to by other names, such as, for example, terminal devices, user devices, or telephones. Node 1 and Node 2 may be gateways such as, for example, a HiPath 4000 system. It is contemplated that node 1 or node 2 may also be a PBX, an IP PBX, or other switching device. It is also contemplated that node 1 and node 2 may be access points.

The method begins when signaling entity A sends a request for call setup using a protocol X towards Node 1. This call setup is interworked or translated from protocol X to a different protocol Y, which is used by the network. The translation of the call setup may be performed by Node 1 without paying attention to specific contents of the protocol X "setup" or call setup data in the request Node 1 receives from endpoint A. For example, call setup parameters identified in the call setup request that Node 1 receives from endpoint A may be ignored or may not be incorporated in the translation of the call setup request from protocol X to protocol Y. Additionally, correlation data are created by Node 1 that identify Node 1, which may also be referred to as the ingress node. These correlation data are sent through the network together with the call setup request using protocol Y. Node 1 stores the originally received call setup. The originally received call setup data may be stored in the memory of Node 1, for example.

On receipt of the call setup request at an egress node, Node 2, the egress node establishes a separate connection towards Node 1 using the correlation data of the received call setup message. The separate connection may be a "Message-Proxy" connection also known as a "MP connection" (MP: Message Proxy). Via the MP connection, Node 2 requests the specific signaling information that contains all information elements of protocol X that was originally received by Node 1 and stored by Node 1. In response, Node 1 sends that data in protocol X to Node 2 via connection MP. Node 2 uses the information received from Node 1 to build a call setup request using protocol X that contains the signaling information originally sent by signaling entity A. It should be understood that Node 1 may send data such as the original call setup request information data sent by endpoint A that was stored by Node 1 to Node 2 via the MP connection in response to Node 2's request for specific signaling information sent to Node 1 via the MP connection. Once Node 2 creates a call setup request using protocol X, Node 2 may send that created call setup request in protocol X to endpoint B.

After signaling entity B has received the call setup information from Node 2, it will react with optional provisional responses and finally with a call setup confirmation ("connect") message. The following text describes only the final confirmation message. However the provisional responses can be handled in the same way. As soon as Node 2 receives the "connect" message it generates correlation data that uniquely identify this call at Node 2.

Additionally Node 2 pushes all signaling information to Node 1 using the MP connection.

In parallel to that, Node 2 may interwork or translate the confirmation from protocol X into protocol Y and forward the "connect" message towards Node 1 via the network containing the correlation data created earlier for this call at Node 2.

The translation of the confirmation message may be performed by Node 2 without paying attention to specific contents of the protocol X "connect" message or confirmation message data Node 2 received from endpoint B. For example, confirmation parameters identified in the confirmation message Node 2 received from endpoint B may be ignored or may not be incorporated or may not be completely incorporated into the translation of the confirmation message from protocol X to protocol Y. Node 2 may also save or store the original confirmation message received from endpoint B.

As soon as Node 1 receives the confirmation (or "connect") message via the protocol Y it uses the signaling information received earlier via the MP connection in order to create a confirmation message towards the signaling entity A that contains the full signaling information of the confirmation message sent by the signaling entity B (via protocol X). In addition, or as an alternative, Node 1 may request additional signaling information from Node 2 that is in protocol X via the MP connection. That signaling information may include the original confirmation message information Node 2 received from endpoint B. After Node 1 receives such data or receives the confirmation message from Node 2, all relevant routing information may have been exchanged between the signaling entities A and B to establish a connection between endpoints A and B via Nodes 1 and 2 through the MP connection and/or the network.

It is contemplated that Node 1 may also be configured to create a confirmation message based on the data received from Node 2 relating to the confirmation of the call setup request sent by endpoint B for sending to endpoint A to establish the connection, or call, between endpoints A and B.

Subsequent messages can either be directly forwarded over the MP connection if they are of no relevance to the protocol Y network or they can be partially interworked to the protocol Y network with an additional transparent bypass of the complete protocol X information via the MP connection (as described above for the call setup phase).

The terms "setup" and "connect" are only used as synonyms for the initial request and the confirmation during the call establishment phase. These words should not be understood to limit the way of processing to these specific signaling messages.

Figure 2:
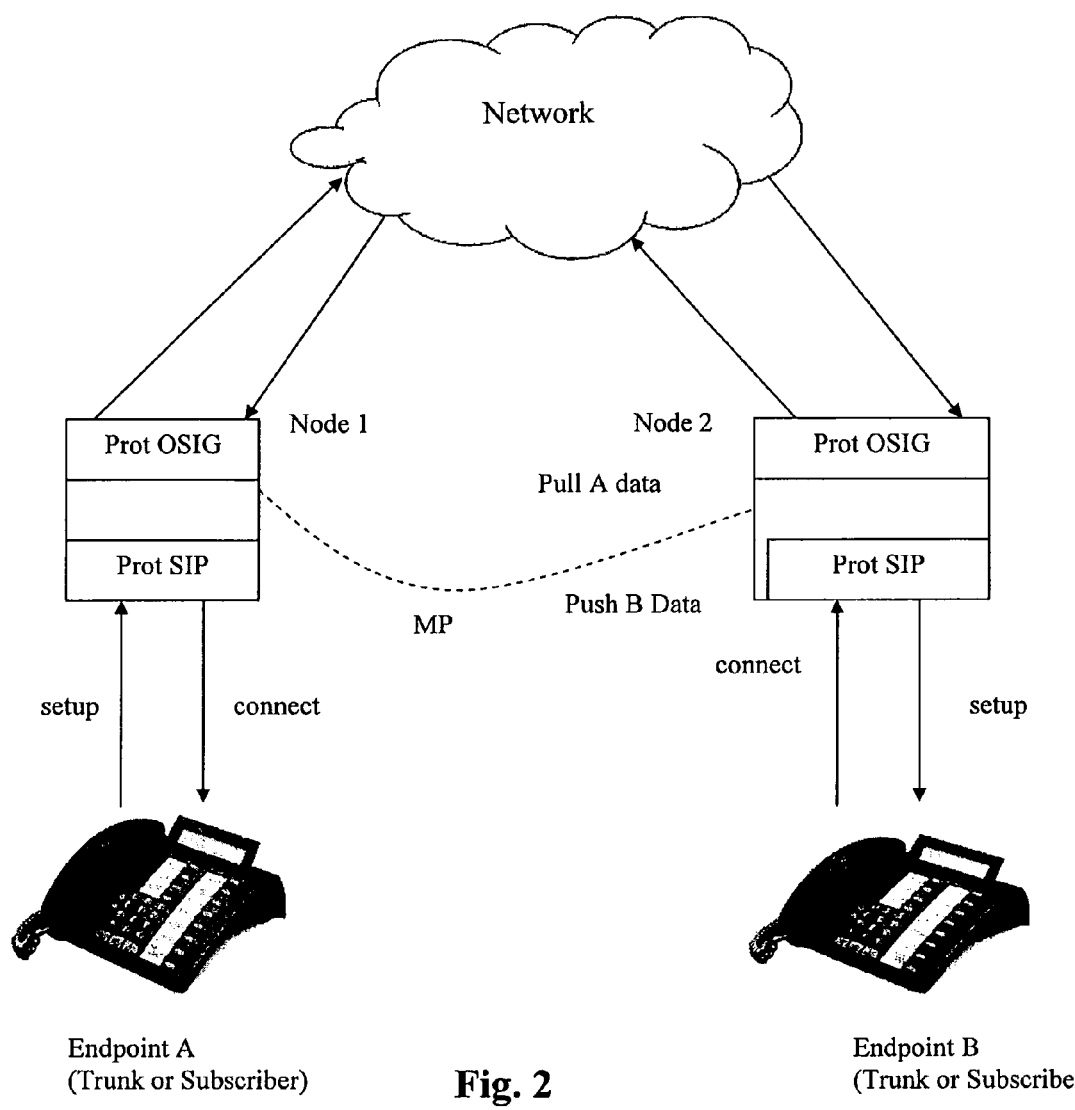
FIG. 2 is a diagram showing an embodiment of a communication system in which messages are transmitted using SIP protocol and QSIG protocol.
Figure 3:
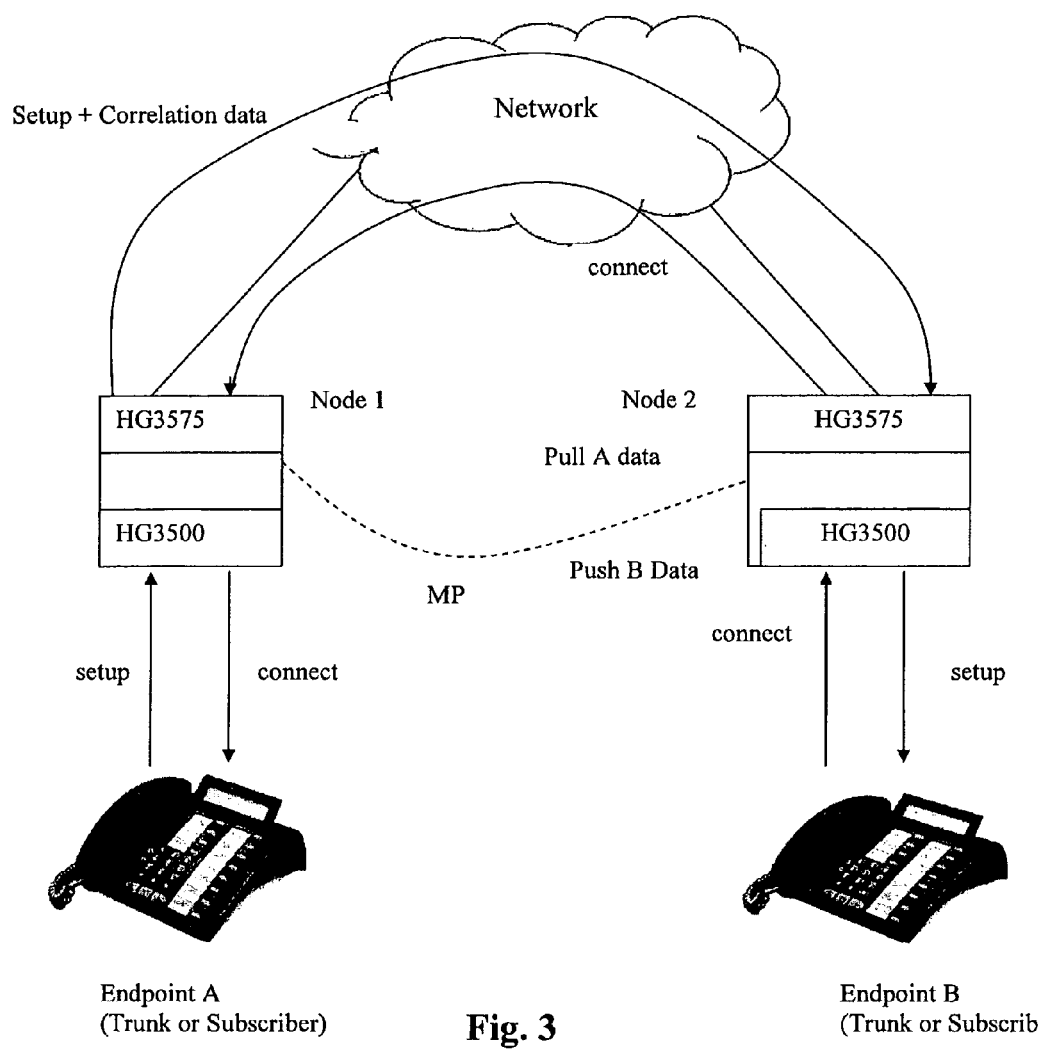
FIG. 3 shows an embodiment of the communication system as part of a HiPath4000 communications system, such as a HiPath4000V6 communication system.

As indicted in FIG. 2 one can use SIP protocol and OSIG protocol in the present method and apparatus. Furthermore, the present method can be implemented in a HiPath 4000 communication system configuration, such as the communication system shown in FIG. 3.

Using our method and apparatus, one can reach signaling transparency between two signaling entities that are connected via an in-transparent network by just exchanging correlation data between the participating ingress and egress gateways. The gateways can in turn exchange the signaling information transparently by using the established bypass connection (MP). This also avoids the drawbacks encountered when signaling messages must be tunneled through the in-transparent switching node/network.

Although the drawings illustrate the method being practiced through the use of telephones, the method is not limited to audio signals. Other kinds of signals, such as text, video instant messaging, or other data, can be transmitted between endpoints even though the connecting signaling network may not support these features.

Although we have described and illustrated certain present preferred embodiments of our method and communication system it should be distinctly understood that the invention is not limited to these embodiments but may be variously embodied within the scope of the following claims.

We claim:

1. A method for initiating a call in a communication network between a first signaling entity and a second signaling entity each connected to a node and the nodes connected to a network wherein communications between the signaling entities and the nodes is conducted using a first protocol and communications are carried over the network using a second protocol, the first protocol being different than the second protocol, comprising:
sending a request for call setup using the first protocol from a first signaling entity to a first node;
converting the request for call setup from the first protocol to the second protocol in the first node;
sending the call setup request converted into the second protocol from the first node via a network to a second node that is connected to a second signaling entity;
converting the call setup request received from the first node from the second protocol to the first protocol in the second node;
establishing a separate connection between the first node and the second node over which communications are sendable using the first protocol;
the second node requesting data from the call setup request in the first protocol sent by the first signaling entity to the first node from the first node via the separate connection;
the first node sending information concerning the data from the call setup request in the first protocol sent by the first signaling entity to the second node via the separate connection; and
transmitting messages between the first node and the second node via the separate connection using the first protocol.

2. The method of claim 1 further comprising:
the second node creating a call setup request in the first protocol and sending that call setup request to the second signaling entity;
the second signaling entity sending a confirmation message to the second node for establishing a connection between the first signaling entity and the second signaling entity; and
the second node transmitting the confirmation message from the second signaling entity to the first node via the separate connection.

3. The method of claim 1 further comprising transmitting other messages between the first node and the second node over the network using the second protocol.

4. The method of claim 1 wherein the first protocol is SIP protocol and the second protocol is QSIG protocol.

5. The method of claim 1 wherein the network is an intransparent network and any messages that are relevant to the operation of the network are transmitted over the network using the second protocol and the method further comprises the second node forwarding information concerning the separate connection to the first node over the network using the second protocol.

6. The method of claim 1 wherein the first node translation of the call setup request received from the first signaling entity is translated into the second protocol without translating all parameters or data of the call setup request in the first protocol received from the first signaling entity.

7. The method of claim 1 wherein correlation data are created by the first node that identify the first node and sent via the network to the second node together with the call setup request.

8. The method of claim 1 wherein the first and second signaling entities are each one of a communication endpoint, a telephone, a computer device, a cell phone, a terminal device, a user device and a signaling device of a trunk.

9. A communications system comprising:
a communication network;
a first signaling entity connected to the network through a first node;
a second signaling entity connected to the network through a second node;
wherein communications between the nodes and the signaling entities are conducted using a first protocol and communications are carried over the network using a second protocol that is different from the first protocol; and
wherein the nodes have the capability of translating messages received from the signaling entities in a format according to the first protocol to a format according to the second protocol for transmission over the network using the second protocol;
a communication path separate from the network between the first node and the second node over which messages are sent using the first protocol;
wherein the nodes and signaling entities are configured to support a request for call setup using the first protocol from a first signaling entity to a first node by being configured:
to convert the request for call setup from the first protocol to the second protocol in the first node;
to send the call setup request converted into the second protocol from the first node to a second node that is connected to a second signaling entity via a network;
to convert the call setup request received from the first node from the second protocol to the first protocol in the second node; wherein the second node is configured to request data from the call setup request in the first protocol sent by the first signaling entity to the first node from the first node via the separate connection; and
the first node is configured to send information concerning the data from the call setup request in the first protocol sent by the first signaling entity to the second node via the separate connection; and to transmit messages between the first node and the second node via the separate connection using the first protocol.

10. The communication system of claim 9 wherein the first signaling entity is one of a communication endpoint, a telephone, a computer device, a cell phone, a terminal device, a user device and a signaling device of a trunk; and
wherein the second signaling entity is one of a communication endpoint, a telephone, a computer device, a cell phone, a terminal device, a user device and a signaling device of a trunk.

11. The communication system of claim 9 wherein the first protocol is SIP protocol and the second protocol is QSIG protocol.

* * * * *